C. B. REDRUP.
VALVE GEAR OF INTERNAL COMBUSTION ENGINES.
APPLICATION FILED JUNE 2, 1919.
1,312,577.
Patented Aug. 12, 1919.
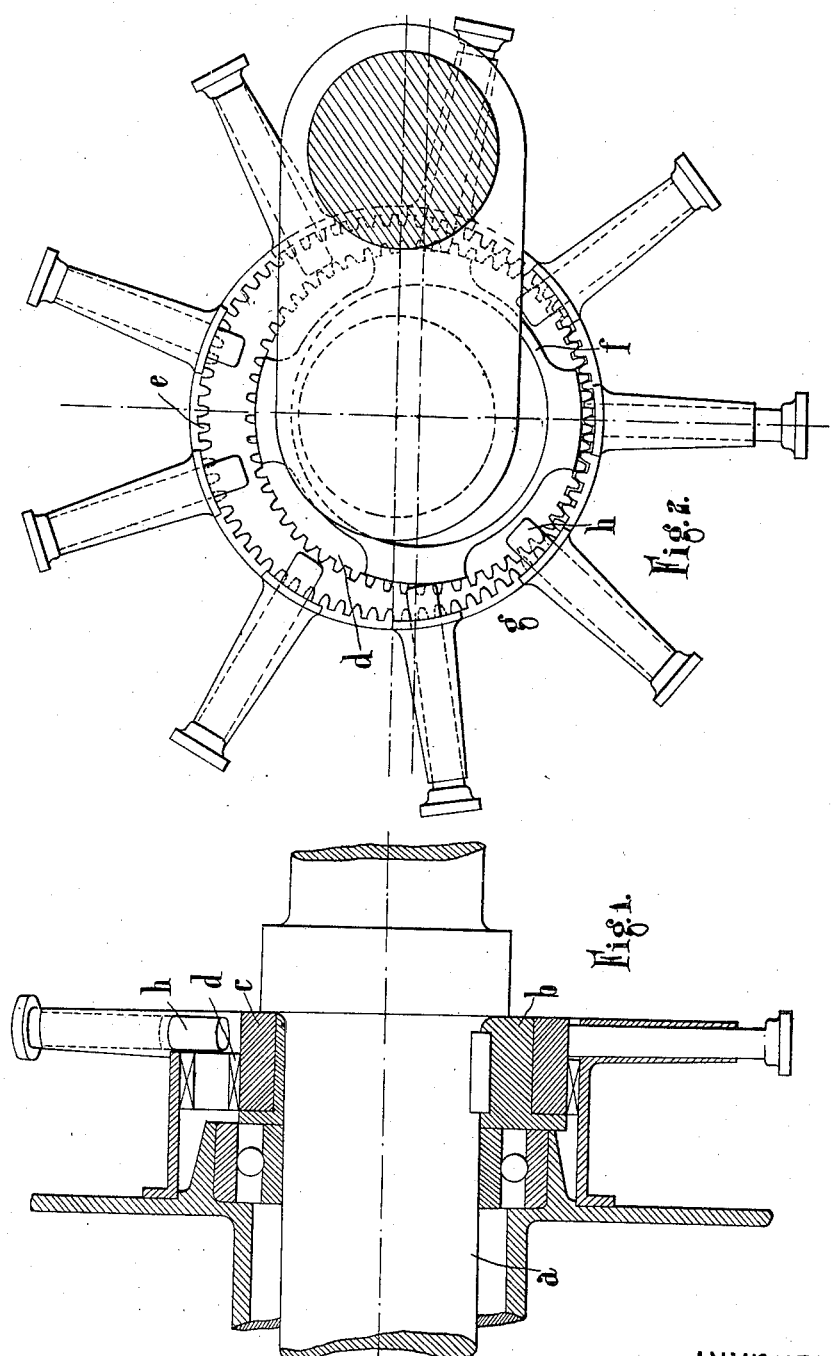
INVENTOR
C.B. Redrup,
BY H. P. Kerslake
ATTORNEY

UNITED STATES PATENT OFFICE.

CHARLES BENJAMIN REDRUP, OF LEEDS, ENGLAND.

VALVE-GEAR OF INTERNAL-COMBUSTION ENGINES.

1,312,577.      Specification of Letters Patent.      Patented Aug. 12, 1919.

Application filed June 2, 1919. Serial No. 301,320.

*To all whom it may concern:*

Be it known that I, CHARLES BENJAMIN REDRUP, a subject of the King of Great Britain and Ireland, and residing at 18 Roseville Terrace, Roundhay Road, Leeds, in the county of York, England, have invented certain new and useful Improvements in the Valve-Gears of Internal-Combustion Engines, of which the following is a specification.

This invention relates to valve gear for internal combustion engines of the type in which the valve tappets are operated by cams upon a drum or bush loosely mounted on an eccentric on the crank shaft, the drum being positioned by means of teeth thereon engaging with an internally toothed wheel forming part of or secured to the crank casing and concentric with the crank shaft.

The object of the present invention is to provide an improved form of valve gear of the above type, and the invention consists in valve gear of the kind referred to for internal combustion engines in which the drum is formed with teeth and with separate cam projections of a length equal to the width of a plurality of the positioning teeth.

The invention also comprises the particular form of valve gear hereinafter described and illustrated.

The accompanying drawings illustrate one mode of carrying out the invention.

Figure 1 is a fragmentary view of one form of rotary internal combustion engine fitted with one convenient arrangement of valve-operating gear in accordance with the invention.

Fig. 2 is an elevation of a portion of Fig. 1 showing the valve gear.

In carrying my invention into effect in one convenient manner when devising valve-operating gear particularly suitable for engines of the above type in which one valve is to be mechanically operated while the other valve is automatic, I mount upon or form integral with the crank shaft $a$ of the engine an eccentric $b$ upon which is loosely mounted a sleeve or bush $c$, one part of which is fitted with a spur wheel $d$ adapted to mesh with an internally toothed wheel $e$ forming an integral part of or rigidly secured to the crank case of the engine so that the spur wheel $e$ is in concentric relation to the crank shaft $a$. The outer or other convenient portion of the sleeve or bush $c$ is provided with cut-away portions $f$ so as to leave projecting portions or cams $g$ thereon, the number of projections or cams being determined in relation to the number of cylinders, so that the number of cams may be half the difference between the number of cylinders and unity; that is to say, where, as in the example illustrated, the engine comprises nine cylinders, the number of projecting portions or cams $g$ will be four. The projections $g$ are of a width equal to a predetermined number of teeth on the wheel $e$, and are adapted during the operation of the engine to engage with the tappet rods $h$ or other devices that may be employed for actuating the mechanically operated valves, it being understood that while the eccentric arrangement of the bush actually effects the operation of the valves, the cut-away portions or projections in the bush are necessary to secure accurate timing of the valves, so that the projections during the course of the operation will operate only alternate valves.

The object of the toothed pinions is to secure that the various parts of the gear shall remain in properly timed adjustment to one another, and for a nine cylinder engine the relative number of teeth in the two wheels $d$ and $e$ will be in the proportion of 8 to 9.

The arrangement is such that I am enabled to produce a very light and compact form of valve-actuating gear for rotary internal combustion engines, and it will be clear that the details of construction and arrangement of the various parts may be suitably modified to suit the construction of engine to which the invention is to be applied and the number of cylinders comprised in the engine.

Having now described my invention, what I claim as new and desire to secure by Letters Patent is:—

Valve gear of the character described including in combination a crank casing, a plurality of radially arranged valve operating tappets slidably arranged through the periphery of the casing, a crank shaft journaled therein, an eccentric carried with the shaft, a sleeve loosely mounted upon the eccentric, a spur wheel fitted on the sleeve near the inner edge thereof, an internally toothed wheel carried concentrically of the inner surface of the casing and positioned in proximity to one side of the tappets and meshed by the spur wheel, the outer portion of the sleeve being cut-away to provide uniformly spaced and alternately arranged recesses and projections for coacting with the inner ends of the tappets, substantially as described.

In testimony whereof I have signed my name to this specification.

CHARLES BENJAMIN REDRUP.